Patented Dec. 31, 1935

2,025,947

UNITED STATES PATENT OFFICE 2,025,947

COMPOSITION OF MATTER AND METHOD OF PRODUCING

Irvin W. Humphrey, Wilmington, Del., assignor to Hercules Powder Company, Wilmington, Del., a corporation of Delaware No Drawing. Application September 3, 1931, Serial No. 561,003. Renewed February 16, 1935

14 Claims. (Cl. 260—8)

This invention relates to a new composition of matter and method for its production.

It is known that maleic anhydride can be neutralized either with an alkali, forming an inorganic salt, or with an alcohol forming an ester. But it would not be expected that maleic anhydride, which is acidic, would react with an ester of abietic acid, which is neutral, forming a new chemical compound; an abietate-maleic anhydride. The addition compound may be formed as the result of reaction occurring between the two unsaturated bonds of the abietic acid ester and the unsaturated linkage of the maleic anhydride, yielding an ester of abietic acid which contains a reactive anhydride group. Abietic acid is a monobasic acid but the compound formed by treating an ester of abietic acid, as for example, methyl abietate, with maleic anhydride may be termed methyl abietate-maleic anhydride. This new compound may be considered as the mono-ester of a new resin acid containing the abietyl radical, its carboxyl group being neutralized by methanol, and which possesses a reactive anhydride group. Uniting the rosin ester with maleic anhydride serves a dual purpose since this method of synthesis not only affords a method of obtaining esters of a new acid possessing the abietyl group, but also results in reducing the unsaturation of the abietic acid ester, thus rendering it more stable to light and air.

By virtue of possessing a reactive anhydride group, the various abietate maleic anhydride compounds may be reacted with an alkali, as sodium hydroxide, calcium hydroxide, potassium carbonate, etc., or with a reactive oxide as calcium oxide, ethylene oxide, etc., or with a suitable alcohol such as methanol, ethyl, butyl, amyl, propyl, stearol, laurol, a glycol, glycerol, borneol, fenchyl, ethylene glycol monoethyl ether, mixtures of alcohols, etc.

The abietate-maelic anhydride compound may be employed in protective coatings such as lacquers, varnishes, etc., but it is preferably first converted into one of its more complex esters, by treatment with a polyhydric alcohol such as ethylene glycol or glycerol. An excess of the polyhydric alcohol may be added over that required to combine with the anhydride group; any free hydroxyl groups thus introduced may be esterified by treatment with an organic acid such as acetic, citric, succinic, phthalic, abietic, dihydro or tetryhydro abietic, oleic, linoleic, linolenic, stearic, etc., or mixtures of suitable organic acids, yielding a product which is also adapted for use in protective coatings and in plastics. Drying or semi-drying oils may be added, if desired.

The method in accordance with this invention for production of the new composition or resinous material embodying this invention will appear from the following description and examples of the production of the new composition.

For the production of the composition embodying this invention, maleic anhydride may be reacted with any suitable ester of abietic acid, such, for example, as an ester of a monohydric or polyhydric alcohol, as ethyl abietate, methyl abietate, propyl abietate, butyl abietate, amyl abietate, a glycol abietate, glycerol abietate, benzyl abietate, cyclohexanol abietate, ethylene glycol monobutyl abietate, phenyl abietate, etc. An inorganic abietate as sodium, calcium, aluminum, etc. may be combined with maleic anhydride.

The reaction between the ester of abietic acid and maleic anhydride will be brought about by heating say at a temperature within the range 125° C.–250° C. or more, preferably within the narrower range 150° C. to 200° C., for from 1 to 15 hours. In the reaction, if desired, though not necessarily, a catalyst may be used, as for example, paratoluene sulfonic acid, benzene sulfonic acid, or other suitable catalyst. If desired, though not necessarily, the reaction may be carried out in the presence of a solvent such, for example, as xylene, toluene, tetralin, butyl acetate, or other suitable solvent, heating under pressure, if desired, and removing solvent by distillation after the reaction.

As illustrative of the preparation of a composition embodying this invention in accordance with the method embodying this invention, for example, 82 grams of ethyl abietate are heated with 20 grams of maleic anhydride at a temperature of 170° C. for eight hours. The reaction product may then be distilled at a temperature of about 225° C.–250° C. under about 5–10 mm. pressure to remove any unreacted ethyl abietate and maleic anhydride. The product will amount to about 85 grams of resinous material slightly softer than rosin, having an acid number of about 130 and a saponification number of about 250. The resinous product will be fairly pale in color and for the most part can be distilled under about 5 mm. pressure using a bath temperature of about 250° C. to 300° C.

As a further illustration, for example, 80 parts of glycerol abietate, A. N. 5.8, thiocyanate value 72.8, are heated with 25 parts of maleic anhydride at 170° C. for 6 hours. Distilling off the nonreacted maleic anhydride will leave a hard resinous product, A. N. 134, S. N. about 220, thiocyanate value 1.6.

In carrying out the method for the preparation of the new composition the time factor may be reduced or increased, or, in other words, the reaction accelerated or the time required therefor extended, by proceeding at a higher or lower temperature than given in the above illustration. Thus, for example, proceeding at a temperature of about 190° C. the reaction may be effected in about two to four hours or, on the other hand, proceeding at a lower temperature than that given in the above illustration, as for example, a temperature of 150° C., the reaction may require about eight hours.

Generally one mol of maleic anhydride will be used per mol of an abietic acid ester, if the latter is derived from a monohydric alcohol, but the molar proportion of the anhydride may range about 0.8 to 1.2, depending chiefly upon the reactivity of the isomers present in the abietic acid ester. In event the ester is a diabietate it will normally require twice as much maleic anhydride, while a triabietate will usually take three times as much anhydride per mol as a monoabietate.

As has been indicated, in proceeding for the preparation of the product, the maleic anhydride and the ester of abietic acid may be reacted in solution in a suitable solvent. Where the reaction is effected in the presence of a solvent the above procedure may be followed, the product after the reaction has been effected being separated from the solvent by distillation.

Compositions in accordance with this invention, as is indicated, may be formed by reacting various esters of abietic acid with maleic anhydride following the procedure given above, more particularly, with reference to the composition formed by reacting ethyl abietic and maleic anhydride.

The product, if desired, may be hydrogenated to increase its saturation. Hydrogenation may be effected by, for example, passing hydrogen through the product under a pressure of about 200–1500 pounds at a suitable temperature, say a temperature of about 175° C.–200° C., at which temperature the product will be fluid. In connection with hydrogenation, an active hydrogenation catalyst, as for example, nickel, platinum, or other suitable hydrogenation catalyst, should be used.

The reaction product may, if desired, be neutralized with an alcohol, as for example, a monohydric alcohol or a polyhydric alcohol and, if desired, though not necessarily, the alcohol treated product may be subjected to treatment with, for example, an organic acid to effect esterification of any free hydroxyl groups introduced as a result of treatment with an excess of alcohol. In connection with treatment of the reaction product with an alcohol, an esterification catalyst, as for example, toluene sulfonic acid, sulfuric acid, etc. may be used.

Where the treatment is with certain monohydric alcohols, such as butyl, benzyl, amyl alcohol, the treatment will involve heating the alcohol together with the reaction product under atmospheric pressure at a suitable temperature, say within the range 120° C. to 225° C. On the other hand, where the treatment is with a lower aliphatic alcohol, such as methyl, ethyl alcohol, or the like, the treatment generally will involve heating at a suitable temperature, say within the range about 150° C.–250° C. under suitable pressure, for example, 200–1000 pounds, and where the treatment is with a polyhydric alcohol, as ethylene glycol, glycerol, etc., the treating will be at a temperature of about 200° C.–275° C.

Many of the abietate maleic anhydride compounds may be partially distilled under vacuum, say about 5 mm. pressure, making a preliminary cut to separate any unreacted abietate and maleic anhydride and then distilling up to a bath temperature about 300° C. making cuts if desired at about 260° and 300° and leaving a residue. Either the distillates or the residue may be separately treated with alcohols.

In carrying out the method embodying this invention for the production of a new composition, it will be understood that the temperatures and ranges of temperatures given above are for purposes of illustration and that I do not contemplate limitation of my invention thereto, since any temperature may be used which will effect the reaction indicated and the selection of any particular temperature within operable limits will be governed largely by the time factor desired. It will also be understood that maleic acid may be reacted with the abietate instead of maleic anhydride.

I have not herein claimed the method involving hydrogenating the product of abietic acid ester with maleic anhydride and the product thereof, since such forms the subject matter of an application for United States patent filed by me as a continuation in part hereof, Serial No. 21,381, filed May 14, 1935. I have not claimed herein the method involving the reaction of an alcohol with a reaction product of an abietic acid ester and maleic anhydride, or with a hydrogenated reaction product of an abietic acid ester and maleic anhydride, and the products thereof, nor have I claimed herein the method involving the reaction of an organic acid with a product of the reaction of an abietic acid ester and maleic anhydride with an alcohol, nor the reaction of an organic acid with a hydrogenated product of the reaction of an abietic acid ester and maleic anhydride with an alcohol, nor the products thereof, since such form the subject matter of an application for United States patent filed by me as a continuation in part hereof, Serial No. 9,805, filed March 7, 1935.

What I claim and desire to protect by Letters Patent is:

1. As a new composition of matter the reaction product of an ester of abietic acid and maleic anhydride.

2. As a new composition of matter the reaction product of a dihydric alcohol ester of abietic acid and maleic anhydride.

3. The reaction product of a monohydric alcohol ester of abietic acid and maleic anhydride.

4. The reaction product of a polyhydric alcohol ester of abietic acid and maleic anhydride.

5. The reaction product of ethyl abietate and maleic anhydride.

6. The reaction product of methyl abietate and maleic anhydride.

7. As a new composition of matter the reaction product of glycerol abietate and maleic anhydride.

8. The method of producing a synthetic resin which includes reacting an abietic acid ester with maleic anhydride.

9. The method of producing a synthetic resin which includes reacting a monohydric alcohol ester of abietic acid with maleic anhydride.

10. The method of producing a synthetic resin which includes reacting a polyhydric alcohol ester of abietic acid with maleic anhydride.

11. The reaction product of an ester of abietic acid united with one mol of maleic anhydride for each abietyl group present in the ester.

12. The method of producing a synthetic resin which includes reacting a neutral ester of abietic acid with maleic anhydride.

13. The method of producing a synthetic resin which includes reacting a neutral polyhydric alcohol ester of abietic acid with maleic anhydride.

14. The method of producing a synthetic resin which includes reacting a neutral monohydric alcohol ester of abietic acid with maleic anhydride.

IRVIN W. HUMPHREY.